(12) United States Patent
Klaussner

(10) Patent No.: US 7,687,963 B2
(45) Date of Patent: Mar. 30, 2010

(54) SLOT SEAL

(75) Inventor: Bernhard Klaussner, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 11/994,475

(22) PCT Filed: Jun. 28, 2006

(86) PCT No.: PCT/EP2006/063641

§ 371 (c)(1),
(2), (4) Date: Jan. 2, 2008

(87) PCT Pub. No.: WO2007/003546

PCT Pub. Date: Jan. 11, 2007

(65) Prior Publication Data

US 2008/0203844 A1 Aug. 28, 2008

(30) Foreign Application Priority Data

Jul. 1, 2005 (DE) .................. 10 2005 030 877

(51) Int. Cl.
*H02K 3/48* (2006.01)

(52) U.S. Cl. .................................. 310/214

(58) Field of Classification Search ............. 310/214
See application file for complete search history.

(56) References Cited

U.S. PATENT DOCUMENTS

| 2,710,931 | A |   | 6/1955  | Tittel et al. |
|-----------|---|---|---------|---------------|
| 2,723,142 | A | * | 11/1955 | Stebbins ............ 277/645 |
| 3,242,239 | A |   | 3/1966  | Schafer et al. |
| 3,719,988 | A |   | 3/1973  | Nielsen |
| 3,940,647 | A |   | 2/1976  | Keuper et al. |
| 4,200,818 | A |   | 4/1980  | Ruffing et al. |
| 4,874,649 | A | * | 10/1989 | Daubenbuchel et al. .... 428/36.5 |
| 5,258,681 | A | * | 11/1993 | Hibino et al. ............ 310/214 |
| 5,575,485 | A | * | 11/1996 | Merla et al. ............. 277/629 |
| 5,598,049 | A |   | 1/1997  | Meier |
| 6,308,961 | B1 | * | 10/2001 | Kunikane et al. ......... 277/637 |
| 6,677,020 | B2 | * | 1/2004  | Dron .................. 428/36.91 |

FOREIGN PATENT DOCUMENTS

DE 967 528 11/1957

(Continued)

OTHER PUBLICATIONS

Machine Translation EP0379012A2 (1990).*

(Continued)

*Primary Examiner*—Quyen Leung
*Assistant Examiner*—Jose A Gonzalez Quinones
(74) *Attorney, Agent, or Firm*—Henry M. Feiereisen; Ursula B. Day

(57) ABSTRACT

The invention relates to a slot seal for an electric machine (13) comprising at least one slot (4) provided with a slot opening for arranging an electric conductor arrangement (6), wherein said slot sealing comprises, on the face thereof oriented towards the conductor arrangement (6), at least one bulge (1) which is oriented to the electric conductor arrangement (6), extends along at least one part of the slot seal length and is selected in such a way that it is elastic or at least deformable and the ends thereof are fixedly interconnected, at least partially, by a cover (2).

8 Claims, 1 Drawing Sheet

FOREIGN PATENT DOCUMENTS

| | | |
|---|---|---|
| DE | 10 40 671 | 10/1958 |
| DE | 11 73 982 A | 7/1964 |
| DE | 12 88 186 A | 1/1969 |
| DE | 71 166 A | 11/1970 |
| DE | 20 60 361 | 6/1972 |
| DE | 21 23 620 | 11/1972 |
| DE | 29 10 736 A1 | 9/1979 |
| DE | 299 08 925 U1 | 8/1999 |
| EP | 0379012 A2 * | 7/1990 |
| JP | 67022345 | 2/1982 |
| JP | 59080129 A * | 5/1984 |
| JP | 07236245 A * | 9/1995 |

OTHER PUBLICATIONS

Machine Translation JP07236245 (1995).*
English Translation JP59080129A (1984).*

* cited by examiner

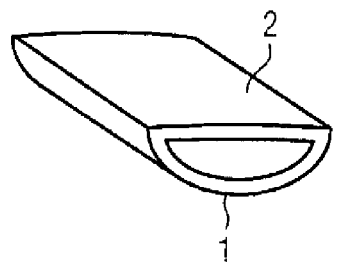
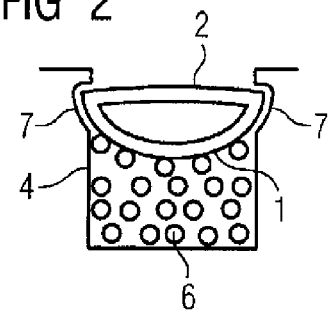
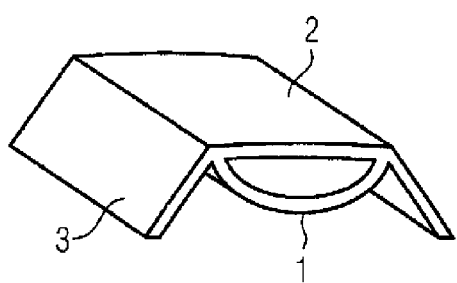
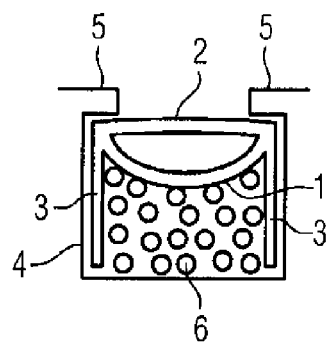
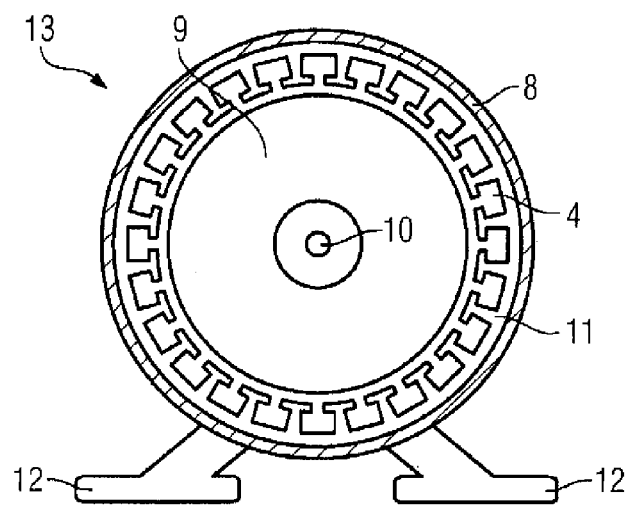

SLOT SEAL

BACKGROUND OF THE INVENTION

The invention relates to a slot seal for an electrical machine which contains at least one slot with a slot opening for holding an electrical conductor arrangement, wherein the slot seal can be inserted in order to seal the slot opening.

Slot seals are used in electrical machines, in order to seal slots in the rotor and/or the stator. Conductor arrangements are inserted in the slots and ensure the operation of the electrical machine. The conductor arrangements are formed by winding systems composed of insulated wires. The slot seals ensure that the winding system cannot fall out and become mechanically damaged during assembly of the motor.

The document DE 1 288 186 A discloses one way in which a slot seal can be designed. In this document, the slot seal is in the form of a rigid slot seal wedge.

However, this has the disadvantage that there is generally an intermediate space between the slot seal and the inserted conductor arrangement, as a result of which the conductor arrangement is not optimally fixed. In consequence, the conductor arrangement can move in the slot during operation or transport of the electrical machine, as a result of which the insulation of the conductor arrangement may be damaged by being cut through, and short circuits may occur.

SUMMARY OF THE INVENTION

The invention is therefore based on the object of specifying a slot seal which firmly fixes the conductor arrangement in the slot.

According to the invention, this object is achieved in that the slot seal has at least one convex curve pointing towards the conductor arrangement on the side facing the conductor arrangement, which convex curve extends over at least a part of the length of the slot seal, with the convex curve being sprung or at least deformable, and with the ends of the convex curve being firmly connected to one another at least in places by a cover.

This advantageously means that the conductor arrangement cannot move in the slots, and the insulation on the conductor arrangement cannot be damaged by movement or by being cut through. If the convex curve is sprung, then the slot seal adapts itself while being inserted into the slot, into which the conductor arrangement has already been inserted, and holds this conductor arrangement firmly in the slot, by its springing effect. If the conductor arrangement were to move during operation of the electrical machine, such that an intermediate space is created between the conductor arrangement and the convex curve, then this would be immediately filled by the slot seal, owing to the springing effect of the convex curve. If the convex curve is deformable, then the slot seal adapts itself while being inserted into the slot, into which the conductor arrangement has already been inserted, and fixes the conductor arrangement in the slot. The cover on the convex curve also ensures that the slot seal is more robust. Furthermore, the cover makes it possible to produce prestressing in the convex curve. In this case, the conductor arrangement may be formed from round wires, arrangements in the form of bars, or braided conductors. In this case, the slots may be located in the rotor and/or in the stator of the electrical machine.

The slot seal can accordingly be designed such that it comprises a continuous cover with a continuous convex curve. Alternatively, the convex curve may, however, also be interrupted at a plurality of points, such that the slot seal comprises only the cover at these points. Furthermore, the slot seal can also be manufactured such that the convex curve is continuous and the cover has interruptions, so that, instead of a continuous cover, only a plurality of webs are also formed. One possible electrical machine in which the invention can be used is, for example, a low-voltage machine with winding systems composed of round wires.

A further advantageous refinement results from the slot seal being an extrudate, that is to say the slot seal is produced using an extruder. This allows the slot seal to be produced advantageously at low cost. In this case, the slot seal may also be produced as a continuous extrudate.

Furthermore, the slot seal is advantageously composed at least partially of thermoplastic material. The slot seal can therefore be processed in an extruder, and further processing can advantageously be carried out solely by heating and further deformation. This means that there is no need for comparatively complex machining. An extruder is a worm press which uses the functional principle of a meat grinder to force solid to thick liquid substances out of an opening uniformly, at high pressure and at a high temperature.

The slot seal is optionally in the form of a slot seal wedge or a slot seal cap. If it is in the form of a slot seal wedge, slits, for example, are provided in the side walls of the slot in order to guide and to fix the slot seal wedge in the slot. Alternatively, it is also possible to provide tabs on the side walls of the slot, in order to guide the slot seal wedge.

The slot seal wedge then has at least one convex curve pointing towards the conductor arrangement on the side facing the conductor arrangement, which convex curve expands at least over a part of the length of the slot seal. If the slot seal is in the form of a slot seal cap, then, in addition to at least one convex curve pointing towards the conductor arrangement and a cover at least in places, it also has side surfaces which can be bent alongside the curvature. Once the slot seal cap has been inserted in the slot, then the side surfaces rest on the side walls of the slot. In order to fix the slot seal cap in the slot, the slot has tabs, adjacent to its opening, on each side. Slot seal caps are also referred to as slot covering slides.

The cover may be composed of the same material as the convex curve, or of magnetic material. In the second case, the magnetic material has an advantageous influence on the magnetic field in the electrical machine.

The cavity created by the cover is advantageously at least partially filled with open-pore material. This advantageously makes it possible to fix the deformation state of the slot seal after insertion of the slot seal, by introducing an impregnation resin into the slot seal. The impregnation resin is then absorbed by the open-pore material. Once the impregnation resin has cured, the deformation of the slot seal is then fixed, and the position of the conductor arrangement that is located in the slot is therefore also fixed.

If the slot seal is manufactured using magnetic material or using an open-pore material, then it can also be produced as a co-extrudate. The basic material of the slot seal is then processed together with the magnetic and/or open-pore material in an extruder.

In order to optimize the absorption capability for impregnation resin, the slot seal has at least one opening on the convex curve or the cover. If there were a large number of small openings, it would thus advantageously be possible for impregnation resin to enter the slot seal, and to fix it. Furthermore, this also allows the impregnation resin to penetrate through the slot seal and to fix the conductor arrangement. Furthermore, the springing effect of the convex curve can be advantageously influenced by means of at least one opening on the convex curve. When the slot seal according to the invention is used in an electrical machine, all of the above-mentioned advantages can be achieved. The slot seals advantageously have means for holding and/or fixing a slot seal. These means may be slits in the side walls of the slot or else tabs on both sides of the slot opening.

BRIEF DESCRIPTION OF THE DRAWING

The invention as well as further advantageous refinements of the invention as claimed in the features of the dependent claims will be explained in more detail in the following text with reference to exemplary embodiments which are schematically illustrated in the drawing, without this resulting in the invention being restricted to this exemplary embodiment. In the figures, FIG. 1 shows a slot seal according to the invention in the form of a slot seal wedge;

FIG. 2 shows a slot with a slot seal wedge according to the invention;

FIG. 3 shows a slot seal according to the invention in the form of a slot seal cap;

FIG. 4 shows a slot with a slot seal cap according to the invention; and

FIG. 5 shows an example of an electrical machine.

DETAILED DESCRPITION OF PREFERRED EMBODIMENTS

FIG. 1 shows a slot seal according to the invention in the form of a slot seal wedge. In this example, this comprises a main body in the form of a convex curve 1 and a cover 2, which firmly connects the two ends of the convex curve 1 to one another. When the slot seal wedge is inserted into the slot, then the slot seal wedge matches itself to the conductor arrangement which has been inserted in the slot, by being deformed. The conductor arrangement is fixed firmly in the slot by the springing affect of the convex curve 1. By way of example, the cover 2 is used to make the slot seal wedge robust.

FIG. 2 shows a slot 4 with a slot seal wedge according to the invention. The grooves 7 in the slot 4 in this case guide and fix the slot seal wedge. The springing effect of the convex curve 1 in this case ensures that the conductor arrangement 6 is fixed securely.

In order to optimize the absorption capability for impregnation resin, the slot seal wedge may have at least one opening on the convex curve 1 or the cover 2. Impregnation resin could thus advantageously enter the slot seal and fix it through a large number of small openings on the cover 2 and/or the convex curve 1. Furthermore, this also allows the impregnation resin to penetrate through the slot seal wedge and to fix the conductor arrangement 6. Furthermore, the springing effect of the convex curve 1 can advantageously be influenced by means of at least one opening on the convex curve 1.

FIG. 3 shows a slot seal according to the invention in the form of a slot seal cap. The slot seal cap has side surfaces 3 which are used to guide the slot seal cap in the slot, and to insulate the conductor arrangement 6 in the slot 4.

FIG. 4 shows a slot 4 with a slot seal cap according to the invention. The side walls 3 of the slot seal cap insulate the conductor arrangement 6 which has been inserted into the slot 4. The slot seal cap is held in the slot 4 by tabs 5 on the sides of the slot opening. The springing effect of the convex curve 2 in this case ensures that the conductor arrangement 6 is fixed securely.

In order to optimize the absorption capability for impregnation resin, the slot seal cap may have at least one opening on the convex curve 1 or the cover 2. Impregnation resin could thus advantageously penetrate into the slot seal cap, and fix it, through a large number of small openings on the cover 2 and/or convex curve 1. In addition the impregnation resin can also therefore pass through the slot seal cap, and fix the conductor arrangement. Furthermore, the springing effect of the convex curve 1 can advantageously be influenced by at least one opening in the convex curve 1. FIG. 5 shows an example of an electrical machine 13 having a housing 8 and stand feet 12. The FIG also shows the stator 11 and the rotor 9 with the shaft 10. A number of slots 4 are shown in the stator 11, by way of example.

What is claimed is:

1. A slot seal for sealing a slot opening of a slot for holding an electrical conductor arrangement of an electrical machine, said slot seal comprising:
   a main body having one side which points towards the conductor arrangement and is configured to have a convex configuration, said main body having opposite ends and being made at least partially of thermoplastic material so as to be resilient or at least deformable; and
   a cover to firmly connect the ends of the main body to one another, the cover being made of magnetic material,
   wherein the main body is manufactured together with the magnetic material as co-extrudate.

2. The slot seal of claim 1, wherein the slot seal is a slot sea wedge.

3. The slot seal of claim 1, wherein the slot seal is a slot seal cap.

4. The slot seal of claim 1, wherein a cavity created by the cover is at least partially filled with open-pore material.

5. The slot seal of claim 4, wherein the main body is manufactured together with open-pore material as co-extrudate.

6. The slot seal of claim 1, wherein one of the main body and cover has at least one opening.

7. An electrical machine having at least one slot; an electrical conductor arrangement received in the slot; and at least one slot seal for sealing a slot opening of the slot, said slot seal including a main body having one side which points towards the conductor arrangement and is configured to have a convex configuration, said main body having opposite ends and being made at least partially of thermoplastic material so as to be resilient or at least deformable, and a cover to firmly connect the ends of the main body to one another, the cover being made of magnetic material, wherein the main body is manufactured together with the magnetic material as co-extrudate.

8. A stator of an electrical machine having means for holding and/or fixing a slot seal for sealing a slot opening of a slot for holding an electrical conductor arrangement of the electrical machine, said slot seal including a main body having one side which points towards the conductor arrangement and is configured to have a convex configuration, said main body having opposite ends and being made at least partially of thermoplastic material so as to be resilient or at least deformable, and a cover to firmly connect the ends of the main body to one another, the cover being made of magnetic material, wherein the main body is manufactured together with the magnetic material as co-extrudate.

* * * * *